US007809694B2

(12) United States Patent
Nelson

(10) Patent No.: US 7,809,694 B2
(45) Date of Patent: Oct. 5, 2010

(54) ANALYSIS OF PERFORMANCE DATA FROM A RELATIONAL DATABASE SYSTEM FOR APPLICATIONS USING STORED PROCEDURES OR SQL

(75) Inventor: Kenneth Carlin Nelson, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 11/080,171

(22) Filed: Mar. 15, 2005

(65) Prior Publication Data

US 2006/0212428 A1  Sep. 21, 2006

(51) Int. Cl.
*G06F 7/00* (2006.01)
*G06F 17/00* (2006.01)
*G06F 17/30* (2006.01)

(52) U.S. Cl. ..................... 707/688; 707/721
(58) Field of Classification Search ............ 707/3, 707/5, 4, 999.003, 999.004, 999.005, 688, 707/721
See application file for complete search history.

(56) References Cited

U.S. PATENT DOCUMENTS

| 5,860,069 | A | * | 1/1999 | Wright ........................... 707/4 |
| 6,026,391 | A | * | 2/2000 | Osborn et al. .................. 707/2 |
| 6,141,699 | A | * | 10/2000 | Luzzi et al. ................. 719/331 |
| 6,148,335 | A | | 11/2000 | Haggard et al. |
| 6,195,653 | B1 | * | 2/2001 | Bleizeffer et al. ............... 707/2 |
| 6,744,449 | B2 | * | 6/2004 | MacLeod et al. ............ 715/772 |
| 6,772,411 | B2 | * | 8/2004 | Hayes et al. ................ 717/127 |
| 2003/0182276 | A1 | | 9/2003 | Bossman et al. |
| 2005/0165741 | A1 | * | 7/2005 | Gordon ......................... 707/3 |

* cited by examiner

*Primary Examiner*—James Trujillo
*Assistant Examiner*—Bruce M Moser
(74) *Attorney, Agent, or Firm*—Patterson & Sheridan, LLP

(57) ABSTRACT

Analyzing performance data from a relational database to discover poorly performing SQL statements includes creating event records of performance data for query statements executed by a relational database management system, and condensing the performance data in the event records. A performance summary can be generated for each condensed event record. The performance summaries can then be analyzed based on performance characteristics to identify poorly performing SQL statements.

20 Claims, 9 Drawing Sheets

2003) Statement Event ...
Appl Handle: 16
Appl Id: G91E9955.PCD4.02CBC2195011
Appl Seq number: 0005

Record is the result of a flush: FALSE

---

Type      : Dynamic
Operation : Close
Section   : 3
Creator   : ICMADMIN
Package   : ICMPLSLM
Consistency Token : HBnuSQMU
Package Version ID :
Cursor    : ICMCURSORRMC
Cursor was blocking: TRUE
Text      : SELECT R.RMCODE, R.RMNAME, R.INETADDR, R.TOKENDURATION, R.DOMAINID, RTRIM(R.RMUSERID), RTRIM(R.RMPASSWORD), R.RMPLATFORM, A.PORT, RTRIM(R.USERID), R.CHANGED, R.RMFLAGS, R.RMNAME, R.INETADDR, R.TOKENDURATION, R.DOMAINID, RTRIM(R.RMUSERID), CASE WHEN R.RMPLATFORM<>3 THEN ''    ELSE ICMADMIN.ICMDECRYPT(R.RMPASSWORD)END, A.RMACCESSTYPE, K.KEYWORDNAME, K.KEYWORDDESCRIPTION, A.ACCESSDATA, R.CURRENTVERSION, R.CACHEOBJSIZELIMIT FROM  ICMADMIN.ICMSTRESOURCEMGR   R, ICMADMIN.ICMSTRMACCESSTYPES  A, ICMADMIN.ICMSTNLSKEYWORDS   K WHERE  R.RMCODE = A.RMCODE AND A.RMACCESSTYPE = K.KEYWORDCODE AND A.RMACCESSTYPE > 0 AND K.LANGUAGECODE = 'ENU' AND K.KEYWORDCLASS = 15 AND R.RMCODE = 1 AND ( R.DOMAINID = 1000 OR R.DOMAINID= 2) ORDER BY A.RMACCESSTYPE  FOR READ ONLY WITH UR

---

Start Time: 01-12-2005 11:48:29.195787
Stop Time:  01-12-2005 11:48:31.917939
Exec Time: 2.722152 seconds
Number of Agents created: 1
User CPU: 0.000000 seconds
System CPU: 0.000000 seconds
Fetch Count: 2
Sorts: 0
Total sort time: 0
Sort overflows: 0
Rows read: 3
Rows written: 0
Internal rows deleted: 0
Internal rows updated: 0
Internal rows inserted: 0
Bufferpool data logical reads: 3
Bufferpool data physical reads: 0
Bufferpool temporary data logical reads: 0
Bufferpool temporary data physical reads: 0
Bufferpool index logical reads: 9
Bufferpool index physical reads: 0
Bufferpool temporary index logical reads: 0
Bufferpool temporary index physical reads: 0
SQLCA:
  sqlcode: 0
  sqlstate: 00000

FIG. 3

2514) Transaction Event ...
   Appl Handle: 16

Record is the result of a flush: FALSE
   Appl Id: G91E9955.PCD4.02CBC2195011
   Appl Seq number: 0005
   Completion Status: Committed
   Start time: 01-12-2005 11:48:29.173590
   Stop time:  01-12-2005 11:48:52.788093
   Exec Time:  23.614503 seconds
   Previous transaction stop time: 01-12-2005 11:48:29.168810
   User CPU: 0.010000 seconds
   System CPU: 2.550000 seconds
   Lock wait time: 15
   Maximum number of locks held: 31
   Lock escalations: 0
   X lock escalations: 0
   Rows Read: 338
   Rows Written: 9
   Log space used: 7165

FIG. 4

| Application ID | Stop | Package | Sec | SQL Time | App Time |
|---|---|---|---|---|---|
| G91E9955.PCD4.02CBC2195011 | 11:48:31.917939 | ICMPLSLM | 3 | 2.722152 | 0.000000 |
| G91E9955.PDD4.021A02195013 | 11:48:31.917951 | ICMPLSLM | 3 | 0.172717 | 0.000000 |
| G91E9955.PBD4.01AB02195009 | 11:48:32.130010 | STORPROC | 1 | 0.000076 | 0.211983 |
| G91E9955.PAD4.016582195007 | 11:48:32.136016 | STORPROC | 1 | 0.000077 | 0.005929 |
| G91E9955.A6D4.018742195031 | 11:48:31.806533 | ICMPLSCF | 27 | 0.000633 | 0.000000 |
| G91E9955.PED4.021042195015 | 11:48:34.355576 | | 0 | 2.537938 | 0.011105 |
| G91E9955.PED4.021042195015 | 11:48:34.355634 | | 1 | 2.568952 | 2.585765 |

| Buffer Pool Reads | | | | | | | | | | | |
|---|---|---|---|---|---|---|---|---|---|---|---|
| Rows | | | Data | | Temp Data | | Index | | Temp Inx | | |
| Read | Write | Fetch | Sort | Log | Phy | Log | Phy | Log | Phy | Log | Phy |
| 3 | 0 | 2 | 0 | 3 | 0 | 0 | 0 | 9 | 0 | 0 | 0 |
| 3 | 0 | 2 | 0 | 3 | 0 | 0 | 0 | 9 | 0 | 0 | 0 |
| 0 | 0 | 0 | 0 | 0 | 0 | 0 | 0 | 0 | 0 | 0 | 0 |
| 0 | 0 | 0 | 1 | 0 | 0 | 0 | 0 | 1 | 0 | 0 | 0 |
| 0 | 0 | 0 | 0 | 0 | 0 | 0 | 0 | 0 | 0 | 0 | 0 |
| 6 | 2 | 0 | 0 | 0 | 0 | 0 | 0 | 0 | 0 | 0 | 0 |

| Type | Operation | rc | Stmt |
|---|---|---|---|
| Dynamic | CLOSE | 0 | SELECT R.RMCODE, R.RMPLATFORM, A.PORT, RTRIM(R.USERID), R.CHANGED, |
| Dynamic | CLOSE | 0 | SELECT R.RMCODE, R.RMPLATFORM, A.PORT, RTRIM(R.USERID), R.CHANGED, |
| Dynamic | PREPARE | 0 | Call ICMCREATEITEMS(?,?,?,?,?,?,?,?,?,?,?,?,?,?,?,?) |
| Dynamic | PREPARE | 0 | Call ICMCREATEITEMS(?,?,?,?,?,?,?,?,?,?,?,?,?,?,?,?) |
| Static | CLOSE | 0 | DECLARE CSRAUTOFLDR CURSOR FOR SELECT SOURCEITEMTYPEID, SOURCECOMPT |
| Static | COMMIT | 0 | |
| TRX | | 0 | |

FIG. 5

```
                                                         ------ Average ------
Package  Section Count  Total SQL  Avg SQL   %Total   Total CM   Avg CM    %Total
ICMPLSLM    3      10   0.030953   0.003095  0.0043   0.022453   0.002245  0.0025
ICMPLSLM    3      10   0.000224   0.000022  0.0000   2.550027   0.255003  0.2785
ICMPLSLM    3      10   2.940698   0.294070  0.4065   0.000000   0.000000  0.0000

------ Average ------            ------------- Average Buffer Pool Reads -------------
       Rows                         Data            Temp Data        Index         Temp Inx
Max                                                                                             
Reads  Read Write Fetch Sort Total Log Phy  Log Phy  Log Phy  Log Phy
 3      0    0    0     0    2    1   0    0   0    0   1    0   0
 0      0    0    0     0    0    0   0    0   0    0   0    0   0
25      3    0    2     0   12    3   0    0   0    0   9    0   0

Type     Operation Stmt
Dynamic  PREPARE   SELECT R.RMCODE, R.RMPLATFORM, A.PORT, RTRIM(R.USERID), R.CHANGED,
Dynamic  OPEN      SELECT R.RMCODE, R.RMPLATFORM, A.PORT, RTRIM(R.USERID), R.CHANGED,
Dynamic  CLOSE     SELECT R.RMCODE, R.RMPLATFORM, A.PORT, RTRIM(R.USERID), R.CHANGED,
```

FIG. 6

```
Package Section Count      Total SQL      Avg SQL    %Total    Total CM    Avg CM    %Total
ICMOSD0E   17      26     137.854789    5.302107   19.0543   0.000000    0.000000   0.0000

------ Average ------                          ------ Average Buffer Pool Reads ------
                                                   Data          Temp Data       Index         Temp Inx
Max     Rows
Reads   Read  Write  Fetch  Sort  Total  Log  Phy  Log  Phy  Log  Phy  Log  Phy
252     5     6      0      0     67     7    0    6    0    48   4    0    0

TYPE  OPERATION STMT
STATIC EXECUTE INSERT INTO ICMUT01021001( COMPCLUSTERID, COMPONENTID, ITEMID, VERSIONID, ACLCODE,
SEMANTICTYPE, COMPKEY, CREATEUSERID, LASTCHANGEDUSERID, CREATETS, LASTCHANGEDTS, EXPIRATIONDATE, RMCODE,
SMSCOLLCODE, RESOURCELENGTH, MIMETYPEID, OBJECTUPDATED, RESOURCEFLAG, XDOCLASSID, EXTOBJECTNAME, TIEFLAG, TIEREF,
OBJECTCREATED, ORIFNAME, CCSID, LANGUAGECODE, FORMAT, ATTR0000001031, ATTR0000001032, ATTR0000001033, ATTR0000001034,
ATTR0000001035, ATTR0000001036, ATTR0000001038, ATTR0000001040, ATTR0000001041, ATTR0000001042, ATTR0000001043,
ATTR0000001044, ATTR0000001045, ATTR0000001047, ATTR0000001049, ATTR0000001050, ATTR0000001051,
ATTR0000001052, ATTR0100000100, ATTR0100000101, ATTR0100000105, ATTR0100000110, ATTR0100000115, ATTR0100000120,
ATTR0000001022 ) VALUES (:H00020, :H00021, :H00022, :H00023, :H00024, :H00025, :H00026, :H00027, :H00028, :H00029,
:H00037,:H00076, :H00077, :H00078, :H00079, :H00080, :H00081, :H00082, :H00043, :H00044, :H00083,
:H00045, :H00084, :H00046, :H00085, :H00047, :H00086, :H00048, :H00087, :H00049, :H00088, :H00050, :H00089, :H00051, :H00090, :H00052, :H00091,
:H00001, :H00092, :H00053, :H00093, :H00054, :H00094, :H00055, :H00095, :H00056, :H00096, :H00057, :H00097, :H00058, :H00098, :H00059, :H00099,
:H00060, :H00100, :H00061, :H00101, :H00062, :H00102, :H00063, :H00103, :H00064, :H00104, :H00065, :H00105, :H00002, :H00106, :H00066, :H00107,
:H00067, :H00108, :H00068, :H00109, :H00003, :H00110, :H00069, :H00111, :H00070, :H00112, :H00071, :H00113, :H00072, :H00114, :H00073, :H00115,
:H00074, :H00116, :H00075, :H00117 )
```

FIG. 7

| | |
|---|---:|
| Elapsed time of test | 134.444 |
| Stored procedure calls | 139 |
|    Elapsed time | 288.911 |
| SQL statements | 2471 |
|    Elapsed time | 723.483 |
| Prepare statements | 13 |
| SQL without CLOSE, PREP | 1779 |
|    Elapsed time | 141.005 |
| Transaction time | 583.973 |
| Lock Wait time | 38.550 |
| | |
| Set statements | 22 |
| Commits | 93 |
| Rollbacks | 0 |

FIG. 8

ANALYSIS OF PERFORMANCE DATA FROM A RELATIONAL DATABASE SYSTEM FOR APPLICATIONS USING STORED PROCEDURES OR SQL

TECHNICAL FIELD

The invention relates to the field of database management and performance analysis.

BACKGROUND

Data records in a relational database management system (RDBMS) in a computer are maintained in tables, which are a collection of rows having the same columns. Each column maintains information on a particular type of data for the data records of the rows. Data from the database tables may be accessed using instructions in a language that the database management system recognizes. For example, Structured Query Language (SQL) statements are often used to query, access, and manipulate data in a database.

A SQL statement includes set operators that define operations to be performed by the database management system when searching columns of database tables. For instance, a SQL set operator may look for all records having a field that satisfies a search condition, such as equal to or less than a certain value. Also, the operator can be a join, which combines or concatenates rows from different tables, then searches for those concatenated rows that satisfy a search predicate. Rows from the tables involved in the join operation that do not satisfy the predicate or condition are excluded from the join result.

There are two methods of developing applications which interface with a relational database system. The first is to use static or dynamic SQL statement calls from within the application program. A dynamic SQL statement is constructed by the application program, "prepared" or complied with a call to the database management system, and then executed. A static SQL statement is coded into the application program, and prepared or compiled prior to running the application program.

The second method of developing applications which interface with a relational database system identifies common functions that call one or more SQL statements, and encapsulates each function as a Stored Procedure to be executed at the database server instead of the application, improving performance and in many cases simplifying application development.

When an application program or Stored Procedure is compiled, a separate step is performed to create an access plan for each SQL statement using the operators and search values in the statement to retrieve data in an efficient manner. For a static SQL statement, the access plan is based on the state of the database at the time the plan is generated. The access plan can be recreated using the current state of the database at any time by first updating database statistics and then "re-binding". Most of the access plans generated by this process are optimal.

However, a few poorly performing statements can consume a significant amount of the database management system resources, resulting in a slowdown of the system. To find statements which use a large amount of CPU or I/O time, an event monitor in the database management system creates an event record of each SQL statement or stored procedure that is executed by the system, to record performance information for the executed statement.

When a SQL statement has a performance problem, such as a high execution time or a high number of rows read, written or sorted, finding the SQL statement with this poor execution performance is generally the first step in correcting the problem. For example, the event records for the executed SQL statements are studied to find the statements having these types of performance problems. However, the event monitor can include records for thousands or millions of executed statements, and each record can contain many lines with performance information for a single SQL statement. As a result, searching this amount of data to locate a problem statement is very time consuming, and is therefore often not done.

If the problem statement is executed infrequently, such as once at start-up, then the overall impact on system performance may be insignificant, and the problem statement can be left in place. However, if the problem statement is executed frequently, and accounts for a significant reduction in system performance, then the problem statement needs to be identified so that its execution performance, and the overall performance of the system, can be improved.

Without a tool to summarize the performance records of the executed statements, identifying the problem statement, and the statement's overall impact on system performance, is very difficult. There is therefore a need for a summary of the performance of SQL statements so that poorly performing statements can be identified.

Furthermore, the event monitor typically includes the text of dynamic SQL statements, but not the text of static SQL statements. For static SQL statements, which are coded into the application program, their preparation or compilation is done prior to running the application program. Therefore, the event monitor contains only the package (or module) name and section number of the SQL statement, which indicates the relative position of the SQL statement within the module, rather than the actual text itself.

As a result, most users who are not familiar with the internal storage used by the database management system often attempt to locate the text of the static SQL statement within the source code of the application program using the package name and section number from the event monitor, but this can be time consuming and error prone. This may also be impossible, if the user does not have access to the application source code. A user may also be able to either use a tool, such as a DB2 control center, or have the ability to query a system table, to find the static SQL statement. However, if the event monitor is from another system, then the user may have to ask a customer to find the text of the static statement.

There is therefore also a need to be able to identify the text of a poorly performing static SQL statement from the performance data so that the statement can be further analyzed and tuned for improved performance.

SUMMARY OF AN EMBODIMENT OF THE INVENTION

The compression of raw data from an event monitor into a compact form, such as one line per SQL statement, is performed to show relevant details for the statements, such as the text of static or dynamic SQL statements. This allows a user to more easily see the complete flow of operations and performance of each statement, both within a single application context and across the system.

In one embodiment, the compression technique produces a summary of the event monitor data to provide statistics such as frequency of execution and cost of execution of each statement.

An overall summary can also be produced, to show information such as the elapsed time of the test, the number of stored procedures executed, the number of SQL statements executed, and the wait time, for example. Other data which a user deems as necessary for understanding application performance may also be included in the overall summary.

BRIEF DESCRIPTION OF THE DRAWINGS

FIG. 3 shows an example of an event record that is processed by the method of analyzing performance data.

FIG. 4 shows an example of performance data for a transaction that is processed by the method of analyzing performance data.

FIG. 5 shows an example of a condensed report generated by the method of analyzing performance data.

FIG. 6 shows an example of condensed summaries for a set of executed SQL statements.

FIG. 7 shows a statement identified as a result of sorting the SQL statements of FIG. 6 based on total execution time.

FIG. 8 shows an example of a summary of performance data for statements issued by an application program.

DETAILED DESCRIPTION

An analysis of performance data from a relational database can produce information from the raw performance data to aid in improving SQL statements and stored procedures. A summary of performance data for each executed statement can be generated by the analysis process. Also, a second summary of performance data for a statement executed multiple times can be generated from the first summaries. A third summary of performance data for executed statements associated with a given application program can also be generated from the first summaries.

The analysis of performance data from a relational database discovers poorly performing SQL-based applications by producing a summary of execution information for SQL statements and Stored Procedures. In one embodiment, an event monitor report is processed to condense many lines of a performance record for an executed statement into a smaller number of lines. For example, a summarization tool can analyze event monitor data by reading a formatted event monitor file, extracting static SQL statements from a table, and creating a one line performance report for each executed statement.

Figure 1:
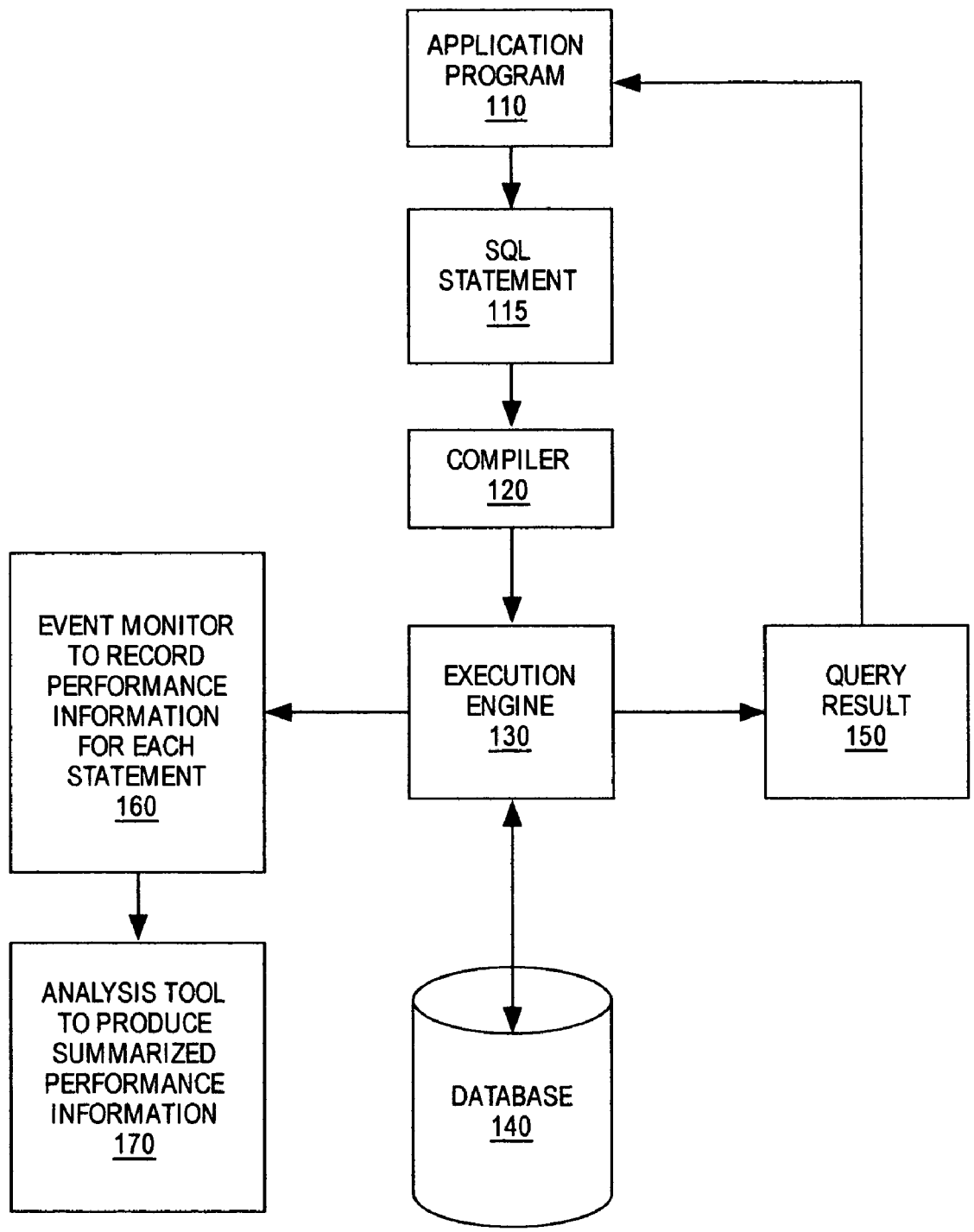
FIG. 1 illustrates a computer system that includes an analysis tool to perform an analysis of performance data.

FIG. 1 illustrates a computer system that includes an analysis tool to perform an analysis of performance data. One or more application programs 110 issue database operations in the form of Stored Procedure calls or SQL statements 115 to compiler 120 of the relational database management system (RDBMS). A Stored Procedure is an encapsulation of application logic and SQL statements which is executed directly under control of the database system instead of being executed from a remote client application. Two types of SQL statements may be executed, static or dynamic. A static SQL statement is fully defined as part of the application, and is compiled along with the application. A dynamic SQL statement is constructed at run time.

For each database operation, compiler 120 receives the corresponding SQL statement and produces an execution plan for the statement. The execution plan is sent to the execution engine 130, which executes the plan to retrieve data from database 140 and return the query result 150 to the application program 110 that issued the query. The execution performance of the plan is recorded by the event monitor 160.

This execution performance information is received by the analysis tool 170, to produce a summary of the execution performance information for the statement. Also, because each application program can issue hundreds or thousands of database queries, the analysis tool 170 can produce a summary of the execution performance information for the set of SQL statements issued by that application program.

Figure 2:
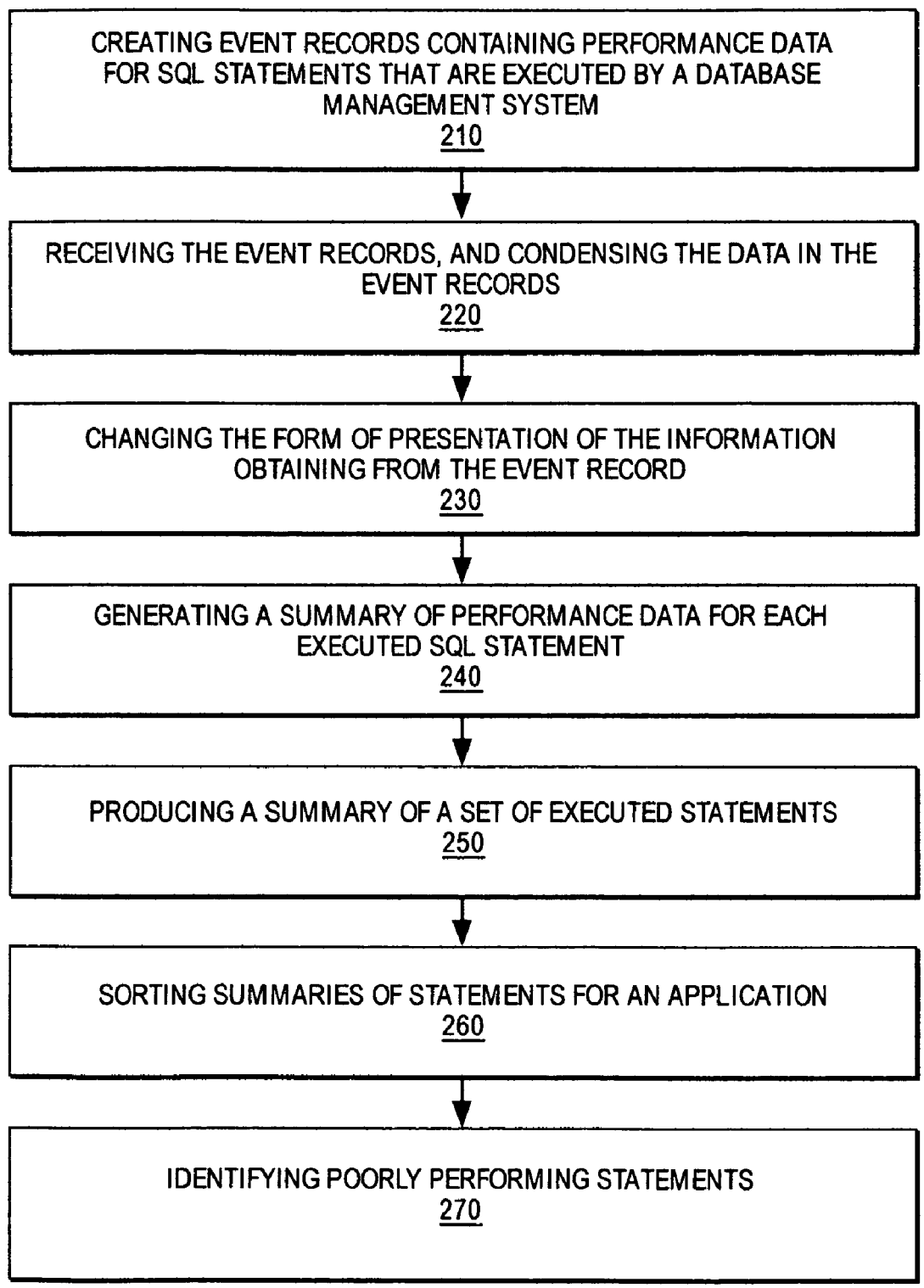
FIG. 2 shows an example of a method of analyzing performance data from a relational database to discover poorly performing SQL statements.

A method of analyzing performance data from a relational database to discover poorly performing SQL statements is shown in FIG. 2. An event monitor creates event records containing performance data for SQL statements that are executed by a database management system, 210. In one embodiment, each event record contains information about an execution of a SQL statement.

The data in the event records is condensed, 220. For example, certain information from the event records can be selected for preservation in a summary, and the non-selected information can be discarded. Certain information that is not available in the event record may also be added to the summary during this procedure. For example, if the executed event is a static SQL statement, then the text of the static SQL statement may be extracted from a table and included with the other relevant performance data. The form of presentation of the information obtained from the event record can be changed, 230. For example, the arrangement of the performance data can be changed from multiple lines as displayed in the event records, into a collection of formatted columns, to improve readability.

A summary of performance data for each executed SQL statement is generated, 240. In one embodiment, the summarization tool produces a one line summary of information about the performance of each executed statement by inserting the condensed performance data for each statement into a row under the formatted columns. In addition to generating a one line summary for each executed statement, the tool can produce a summary of a set of executed statements, 250. For example, the tool can summarize the performance of all SQL statements or stored procedure calls issued by a given application.

The summaries for a given application can be sorted to rank the statements based on one or more performance characteristics, such as their elapsed execution time, 260. The summary information for the SQL statements with a relatively high ranking can be examined to identify poorly performing SQL statements, 270. These poorly performing statements, and their corresponding application programs, can be tuned or changed to improve the overall performance of the database management system.

An example of an event record that is created by the event monitor in 210 of FIG. 2 is shown in FIG. 3. This event record shows an example of the performance related data associated with one executed statement. Certain performance related data of FIG. 3 can be useful in analyzing the performance of the statement and in identifying a poorly performing statement. For example, information such as the application ID field, the text of the statement, the start and stop time, and the execution time can be used to identify a poorly performing statement.

The Application ID field is associated with one connection from an application. A single event monitor report might contain entries for hundreds or even thousands of concurrently executing applications, so this field is important to identify the application program that executed this statement. This field can also be used to identify the set of statements issued by a given application.

The event report shows that the executed statement in the example of FIG. 3 is a dynamic SQL statement from package ICMPLSLM and section 3. Since it is a dynamic SQL statement, the text is included in the event monitor. If it had been a static SQL statement, the text would not have been included in the event monitor. The start and stop time shown by the event record can be used to observer the relative order of execution, and to gain an understanding of the relationship of this statement to other statements executing at the same time.

The event record includes the execution time, which is performance information that frequently gives significant insight into whether the statement performed well. In this case, the statement required 2.7 seconds to complete, which suggests that further analysis may be performed to understand whether this represents a performance problem. For example, since this is a "close" statement, the elapsed time depends on the application which is calling the stored procedure. The length of time could be due to the application not processing the data quickly, or simply leaving the cursor open. Without seeing the other statements executed by the transaction at the same time, it is difficult to speculate about the possible reason the cursor was open for 2.7 seconds.

The event monitor report in the example of FIG. 3 shows that 2 rows were fetched, 3 rows were read, and no rows were inserted, updated or deleted. Physical buffer pool reads represent disk I/O, and logical buffer pool reads represent access to pages already in memory. In this example, these values are relatively low, suggesting that there may not a problem with SQL performance for this statement.

In addition to producing an event report for a statement, the event monitor can produce a report for a transaction, as shown in FIG. 4. A database application will typically execute multiple SQL statements as part of a single transaction, with the end of the transaction being caused either implicitly or explicitly by the application. Except in rare cases, database cursors are closed when a transaction ends. Since database locks can be held during a transaction, it is important to understand the impact of long-running transactions on the overall performance of the application. FIG. 4 shows the data captured in an event monitor for a transaction.

The exemplary record of transaction performance data of FIG. 4 shows that the transaction duration was over 23 seconds, there were 31 locks held, and lock wait time was 15 milliseconds. Although lock wait time is this example is short, a long-running transaction such as this can cause other transactions to lock, which could affect overall system performance. By capturing each transaction event with the application ID, it is possible to discover whether other transactions executing at the same time were blocked, and the overall cost/elapsed time of each transaction in an application.

As can be seen from the event record of FIG. 3, a large amount of performance information, often more than one page, is presented for each executed SQL statement, even though only a subset of this information may be relevant in determining whether the statement performed poorly. To better analyze the relevant performance results, the relevant portions of the report are filtered from the event monitor report. This may be done by processing the raw event monitor file to identify and condense reports for each Statement, Transaction, or Connection event.

For example, the process may express the relevant data condensed from each report as a single line as shown in FIG. 5. The condensed summary file produced in this example has one line of relevant performance data for each event, and can be conveniently viewed by many text editors. (For illustration purposes only, a selection of a few lines of the file is shown as three separate sections in FIG. 5, and the SQL statements are truncated to improve readability.)

To condense the relevant performance measurements in a summary, the process can select data such as, for example, the application ID, stop time, and elapsed time from the event record of FIG. 3. Then, the process can change the format of the condensed performance data from the event records into a collection of formatted columns, where each column identifies a performance measurement preserved from the event record. The process can then create a summarization table by adding each condensed record as a row to the collection of formatted columns, such that each row in the table contains relevant performance data for an executed SQL statement. This process produces a performance summary of each individual statement, as shown in FIG. 5.

The summary of a statement's performance can include the SQL time, which is the amount of time that elapsed during execution of the statement. The summary also includes the application time, which is the amount of time between the end of execution of the previous statement and the beginning of execution of the current statement. This allows the analysis process to distinguish between time spent within SQL statements and time spent between SQL statements, so that the performance of the application code itself can be understood without using a code profiler. A user is then able to identify areas of the code that can be improved.

In this example, FIG. 5 includes a column labeled "App Time" for Application time, which is the time between SQL statements. This data can be used to compare and contrast the time spent executing a SQL statement with the time spent executing the application. This comparison can be valuable in determining whether poor performance is caused by the statement or by the application. For example, if the application time is high relative to SQL time, then the focus of performance analysis would be on the application logic rather than the statement.

The summary can also include the execution start time, the package or module name containing the SQL statement, and the section, which is used to find the text for a static SQL statement. Other information about the statement, such as the number of rows read, written and sorted, the type (static or dynamic), the operation (e.g., commit, execute, prepare, rollback), the return code, or the text of the SQL statement itself, can be included in the summary. For example, during the creation of a summary for a static SQL statement, the text of the static SQL statement can be retrieved from a statement table and added to the summary. In one embodiment, the user can select any information reported by the event monitor to be included in the summary.

In addition to compressing performance information for each executed SQL statement from the event monitor, the data compression program can create summaries for Stored Procedure records in the event monitor. A Stored Procedure is a collection of SQL statements and application logic which is executed at the database server. The summary for a Stored Procedure can contain the difference between the stop time of a stored procedure and the start time of the next for each Application ID. This performance data can indicate time spent performing functions outside of the stored procedures, such as application time, network time, or the overhead for the database system to begin execution of a stored procedure following a call, for example.

The condensed summaries of in FIG. 3 show that the 7 event records extracted from the event monitor file are associated with 6 different database connections. By creating a single line in the condensed summary file for each event, a user can sort the summary file by Application ID (or connection) and the stop time of the statement to see the performance activity for each application. By extracting lines for a selected application ID, a user can see the summary of each SQL statement in the order in which it was executed, to provide insight into the behavior of the application. Also, by extracting only the records where the Type column contains TRX, it is possible to see the elapsed time, statistics for rows and buffer pools, and the lock wait time for each transaction.

Although this example of 7 records is relatively easy to view and understand, the event monitor captured for an actual test can include thousands or even millions of records. To more clearly understand the overall behavior of an application, the compressed summaries shown in FIG. 5 can be further compressed into a second set of summaries as shown in FIG. 6.

A second compression process uses the summaries of FIG. 5 to generate information about a set of executed SQL statements as shown in FIG. 6. For example, when one basic statement is expressed as several dynamic SQL statements, each having the same package and section identifiers but different text, the execution performance information for the several statements is captured by the second compression process in a summary report of the total performance of the several statements. This eliminates multiple entries for the same basic statement, so that the impact of the statement on overall performance is clearer.

As shown in FIG. 6, the summary of performance data for a basic statement executed multiple times includes three steps in executing one dynamic SQL statement—prepare, open, and close. This statement was executed 10 times, with an average SQL time of 0.294 seconds. Although the maximum number of rows read was 25, the average was 3 with 2 rows fetched. The percent of total elapsed time for all 3 steps in this statement is only 0.41%. Even though one execution seemed to indicate that there could be a performance concern, the overall impact of the statement is insignificant. By using a text editor or other tool to sort the file based on percent of SQL time, it is easy to find the statements contributing the most to the elapsed time of the application.

The summary information of FIG. 6 can be analyzed to detect poorly performing SQL statements or stored procedures. For example, if the summary file includes an average elapsed time of each SQL statement from an application, and the percentage of total execution time for each of the SQL statements, a user can sort the summary file based on the percentage of total execution time to identify a SQL statement which has the greatest impact on system performance. FIG. 7 shows a statement identified as a result of sorting the SQL statements of FIG. 6 based on total execution time.

The statement identified in FIG. 7 significantly contributes to the elapsed time of an application. This statement can be reviewed to determine whether design changes will reduce the execution time. The overall system performance can then be improved by reviewing the identified statements for coding changes, database tuning changes, or application design changes to eliminate them entirely.

This statement was executed 26 times with an average execution time of 5.3 seconds. This statement alone accounted for 19% of the elapsed time of the test, so would represent a significant opportunity to improve overall application performance. In this example, the complete SQL statement is included, so that this poorly performing statement can be analyzed for improvement.

The large number of columns being inserted could certainly affect performance. Additional analysis would show that some of these columns are "character large objects" (CLOBs) which due to the nature of the database management system are much slower to insert. By selecting only the records for package ICM0SD0E and section 17, we can see that one execution of this statement took 0.237 seconds, one took 10.5 seconds, one took 15.7 seconds, and the rest took approximately 2.6 seconds. Further review of the detail file shows that the transaction which was executed for the statement that took 15.7 seconds had no lock wait time, so there is no database design issue. From this analysis, a user could conclude that there is probably a I/O or (less likely due to the long time) a CPU constraint causing the insert to be very slow, and would use operating system tools to find whether this is the cause of poor performance.

The summaries of FIG. 5 can also be compressed into a summary of performance data for the statements issued by each application program, as shown in FIG. 8. While the summaries for individual statements, as shown in FIG. 5 for example, can give a clear view of the behavior of the entire system or an individual application, and the cumulative summary files of FIGS. 6 and 7 can help identify statements that should be investigated to improve performance, further summarization can be performed to characterize performance of an individual application, as shown in FIG. 8.

In this example, performance data was gathered from a test that was run for 134 seconds, with 139 stored procedure and 2471 SQL statements executed. (Since a database system can manage multiple concurrent applications, the total elapsed time can be higher than the duration of the test in this example.) The time within stored procedures was 288 seconds, and the time within SQL statements 723 seconds. (SQL elapsed time is higher than stored procedure elapsed time because the Close statement for a cursor returned to the application occurs after the stored procedure ends.) By including the number of SQL statements excluding Close and Prepare, and the elapsed time for these statements, it is possible to see that these accounted for approximately 50% of the SQL time. The lock wait time of 38 seconds is high for such a short test, and suggests that either database or application design issues need to be investigated.

Figure 9:
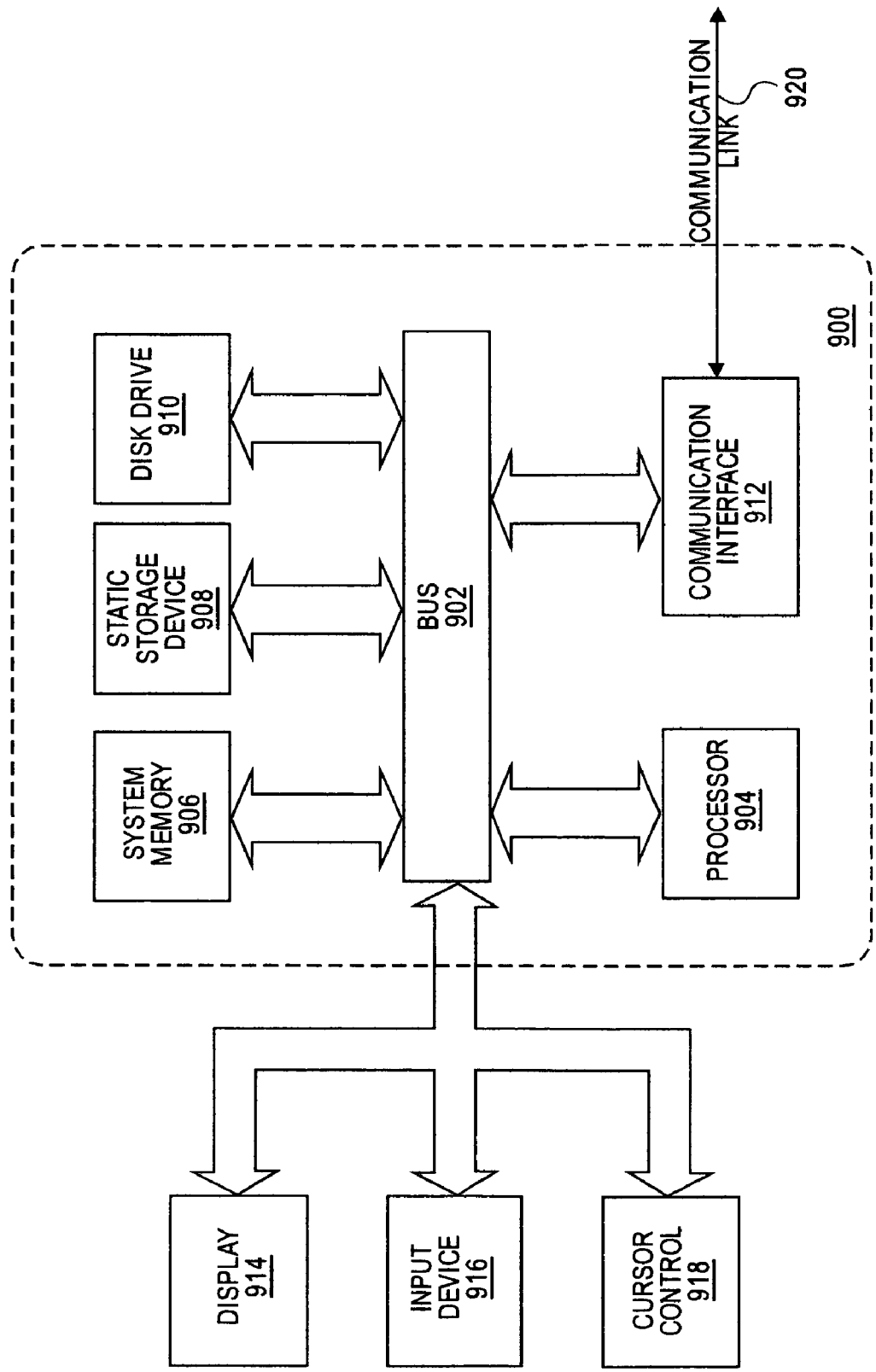
FIG. 9 shows an example of a computer processing system for analyzing performance data.

FIG. 9 shows an example of a computer processing system 900 that can perform an analysis of performance data from a relational database system. A computer program of executable instructions can be stored in a computer-readable medium, such as system memory 906, static storage device 908, or disk drive 910, for example. For the purposes of this specification, the terms "machine-readable medium" and "computer-readable medium" shall be taken to include any medium that is capable of storing or encoding a sequence of instructions for execution by the machine and that cause the machine to perform any one of the methodologies of the present invention. The terms "machine-readable medium" and "computer-readable medium" shall accordingly be taken to include, but not be limited to, solid-state memories, optical and magnetic disks, and a carrier wave that encodes a data signal.

A processor 904 can retrieve the instructions from memory through bus 902, and execute the instructions. A user can also input instructions to the processor through bus 902 using an input device 916, such as a keyboard, or a cursor control device 918, such as a mouse. The processing system 900 can display information to the user using a display 914, such as a computer monitor. The processing system may send and receive information to other electronic devices over a network through communication interface 912, such as a modem for example, and communication link 920.

An analysis of performance data from a relational database system for applications using stored procedures or SQL has been discussed. The analysis can track a number of rows fetched, read, written and sorted, and a number of buffer pool reads. The analysis can report this information for the execution of the statement in a summary line to allow tools such as grep to extract subsets of information. The analysis can also provide a summary that contains a number of stored procedures executed with an elapsed time, a number of SQL statements with elapsed time, SQL statements excluding close and total transaction time.

I claim:

1. A computer-implemented method of analyzing performance data, the method comprising:
   executing, on a processor, an analysis tool, wherein the analysis tool is configured for:
     receiving event records of performance data for query statements executed by a relational database management system;
     condensing the performance data in each respective event record into a summary, wherein the summary for a respective event record includes at least one characteristic of a query statement obtained during execution of that query statement;
     identifying at least one executed query statement based on the at least one characteristic, wherein the executed query statement is issued by at least one application program;
     generating, from the condensed event records related to the identified query statement, a performance summary for the executed query statement; and
     generating a performance summary for the at least one application program from at least the performance summary for the executed query statement.

2. The method of claim 1, further comprising:
   analyzing the performance summaries for the executed statements based on one or more performance characteristics to identify one or more statements.

3. The method of claim 2, further comprising:
   linking each performance summary to the text of the corresponding query statement executed by the relational database management system.

4. The method of claim 1, wherein the executed query statement is issued by a plurality of application programs, and wherein the method further comprises:
   analyzing at least the application program performance summary to identify one or more application programs of the plurality of application programs.

5. The method of claim 4, further comprising:
   for each application program, analyzing the performance summaries for the query statements issued by the identified application program to identify one or more query statements issued by the application program.

6. The method of claim 5, further comprising:
   analyzing the identified application programs and the query statements to improve their performance.

7. The method of claim 1, further comprising:
   sorting the query statements based on the at least one characteristic; and
   ranking the query statements based on the at least one characteristic.

8. The method of claim 1, wherein the at least one characteristic comprises at least one of: elapsed execution time, application ID, query statement text, start time, and stop time.

9. A computer-readable storage medium containing a program, which when executed on a processor performs an operation for analyzing performance data, the operation comprising:
   receiving event records of performance data for query statements executed by a relational database management system;
   condensing the performance data in each respective event record into a summary, wherein the summary for a respective event record includes at least one characteristic of a query statement obtained during execution of that query statement;
   identifying at least one executed query statement based on the at least one characteristic, wherein the executed query statement is issued by at least one application program;
   generating, from the condensed event records related to the identified query statement, a performance summary for the executed query statement; and
   generating a performance summary for the at least one application program from at least the performance summary for the executed query statement.

10. The computer-readable storage medium of claim 9, wherein the operation further comprises:
    analyzing the performance summaries for the executed statements based on one or more performance characteristics to identify one or more statements.

11. The computer-readable storage medium of claim 10, wherein the operation further comprises:
    linking each performance summary to the text of the corresponding query statement executed by the relational database management system.

12. The computer-readable storage medium of claim 9, wherein the executed query statement is issued by a plurality of application programs, and wherein the operation further comprises:
    analyzing at least the application program performance summary to identify one or more application programs of the plurality of application programs.

13. The computer-readable storage medium of claim 12, wherein the operation further comprises:
    for each application program, analyzing the performance summaries for the query statements issued by the identified application program to identify one or more query statements issued by the application program.

14. The computer-readable storage medium of claim 13, wherein the operation further comprises:
    analyzing the identified application programs and the query statements to improve their performance.

15. A system, comprising:
    a processor; and
    a memory containing a program which when executed on a processor performs an operation for analyzing performance data, the operation comprising:
      receiving event records of performance data for query statements executed by a relational database management system,
      condensing the performance data in each respective event record into a summary, wherein the summary for a respective event record includes at least one characteristic of a query statement obtained during execution of that query statement, identifying at least one executed query statement based on the at least one characteristic, wherein the executed query statement is issued by at least one application program, generating, from the condensed event records related to the identified query statement, a performance summary for the executed query statement; and generating a performance summary for the at least one application program from at least the performance summary for the executed query statement.

16. The system of claim 15, wherein the operation further comprises:

analyzing the performance summaries for the executed statements based on one or more performance characteristics to identify one or more statements.

17. The system of claim 16, wherein the operation further comprises:

linking each performance summary to the text of the corresponding query statement executed by the relational database management system.

18. The system of claim 15, wherein the executed query statement is issued by a plurality of applications, and wherein the operation further comprises:

analyzing at least the application program performance summary to identify one or more application programs of the plurality of applications.

19. The system of claim 18, wherein the operation further comprises:

for each application program, analyzing the performance summaries for the query statements issued by the identified application program to identify one or more query statements issued by the application program.

20. The system of claim 19, wherein the operation further comprises:

analyzing the identified application programs and the query statements to improve their performance.

* * * * *